United States Patent
Wu et al.

(10) Patent No.: US 7,471,370 B2
(45) Date of Patent: Dec. 30, 2008

(54) COLUMNAR SPACER FOR LIQUID CRYSTAL DISPLAY

(75) Inventors: Der-Chun Wu, Padeh (TW); De-Jiun Li, Padeh (TW)

(73) Assignee: Chunghwa Picture Tubes, Ltd, Taoyuan (TW)

( * ) Notice: Subject to any disclaimer, the term of this patent is extended or adjusted under 35 U.S.C. 154(b) by 358 days.

(21) Appl. No.: 11/350,879

(22) Filed: Feb. 10, 2006

(65) Prior Publication Data
US 2007/0188695 A1 Aug. 16, 2007

(51) Int. Cl.
G02F 1/1339 (2006.01)

(52) U.S. Cl. ......................... 349/156; 349/155

(58) Field of Classification Search ................. 349/156, 349/155
See application file for complete search history.

(56) References Cited

U.S. PATENT DOCUMENTS

| 6,437,847 B1 | 8/2002 | Kishimoto |
| 6,788,378 B2 | 9/2004 | Yi |
| 6,870,593 B2 | 3/2005 | Satoh |
| 2003/0156236 A1 | 8/2003 | Yamada |
| 2005/0052607 A1 | 3/2005 | Mori et al. |
| 2005/0185129 A1 * | 8/2005 | Kim et al. ................ 349/156 |
| 2005/0185130 A1 * | 8/2005 | Oh et al. ................... 349/156 |
| 2005/0264749 A1 | 12/2005 | Lee |
| 2006/0055863 A1 * | 3/2006 | Sawasaki et al. ............ 349/156 |
| 2006/0114404 A1 * | 6/2006 | Lin et al. ................... 349/156 |

FOREIGN PATENT DOCUMENTS

| JP | 2001-33791 A | 2/2001 |
| JP | 2002-181257 A | 6/2002 |
| JP | 2002-182220 A | 6/2002 |
| JP | 2003-84289 A | 3/2003 |
| JP | 2004-191841 A | 7/2004 |
| JP | 2004191841 | 7/2004 |
| JP | 2004-311305 A | 11/2004 |
| JP | 2004-335224 A | 11/2004 |

* cited by examiner

*Primary Examiner*—Frank G Font
*Assistant Examiner*—Jerry Blevins
(74) *Attorney, Agent, or Firm*—Jianq Chyun IP Office

(57) ABSTRACT

Plenty of columnar spacers arranged between the substrates for liquid crystal display are presented. The columnar spacer includes a solid member with a plateau and a crown member atop the plateau and extended from the solid member. The crown member has a mesa with a pattern exposing a portion of the plateau, and the mesa is smaller than the plateau. The exposed plateau is past through an exterior environment.

10 Claims, 4 Drawing Sheets

COLUMNAR SPACER FOR LIQUID CRYSTAL DISPLAY

BACKGROUND OF THE INVENTION

1. Field of the Invention

The present invention relates to a columnar spacer applied to liquid crystal display (LCD), and more especially, to a photo spacer for thin film transistor liquid crystal display (TFT-LCD).

2. Background of the Related Art

In general, LCD panels can be divided into two types according to methods of fill liquid crystal molecules: vacuum fill LCD and one drop fill (ODF) LCD. In a vacuum fill LCD, the CF substrate and the TFT substrate are combined together with a sealant, and only a hole is kept. Then, liquid crystal molecules are slowly injected into the space between the CF substrate and the TFT substrate by capillarity action. However, this requires a lot of time and a great amount of liquid crystal molecules. Therefore, the vacuum fill method is usually applied to fill only small panels with liquid crystal molecules. In an ODF LCD, first, a sealant layer is pasted onto the bordering part of the TFT substrate. Then, liquid crystal molecules are dropped on the central part of a pixel region, and the CF substrate and the TFT substrate are affixed. Finally, an ultraviolet beam is utilized to irradiate the sealant for hardening the sealant such that the CF substrate and the TFT substrate are tightly combined together. In comparison with vacuum fill method, ODF method is more effective, and needs fewer liquid crystal molecules. Hence, at present, the ODF method is normally applied to fill large LCD panels with liquid crystal molecules.

In ODF, the supporting provided by photo spacers plays an influence on the filling of liquid crystal molecules. The inefficient supporting may cause the shocking of liquid crystal molecules, and reverse, the excessive supporting may cause vacuum bubble or drop flow for liquid crystal molecules. Accordingly, the photo spacers capable of adequate supporting are an important issue for ODF. The photo spacers of different heights formed by laminating photo-resists are illustrated in a prior art. The photo spacers of various areas attached to elements in array are illustrated in another prior art. The spacers of different heights formed by laser scanning are illustrated in another prior art. The difference in height for the photo spacers on TFT side or CF (color filter) side is illustrated in another prior art. The photo spacers with various diameters are illustrated in another prior art. These prior arts aforementioned would not provide efficient resolutions on appreciate supporting strength and preventing shocking.

SUMMARY OF THE INVENTION

In order to solve the problems mentioned above, the present invention provides columnar spacers applied to a liquid crystal display to prevent vacuum bubble or drop flow. The design of solid member in the columnar spacer underneath thereof provides good support against leave force to enhance process tolerance for one-drop fill method.

The columnar spacer is provided to reduce shock for a liquid crystal display. With the formation of crown portion, the columnar spacer may implement much elastic deformation against small force to reduce the shocking of liquid crystal.

Accordingly, one embodiment of the present invention provides a columnar spacer arranged between the substrates for liquid crystal display. The columnar spacer includes a solid member with a plateau and a crown member atop the plateau and extended from the solid member. The crown member has a mesa with a pattern exposing a portion of the plateau, and the mesa is smaller than said plateau.

DETAILED DESCRIPTION OF THE INVENTION

Figure 1A:
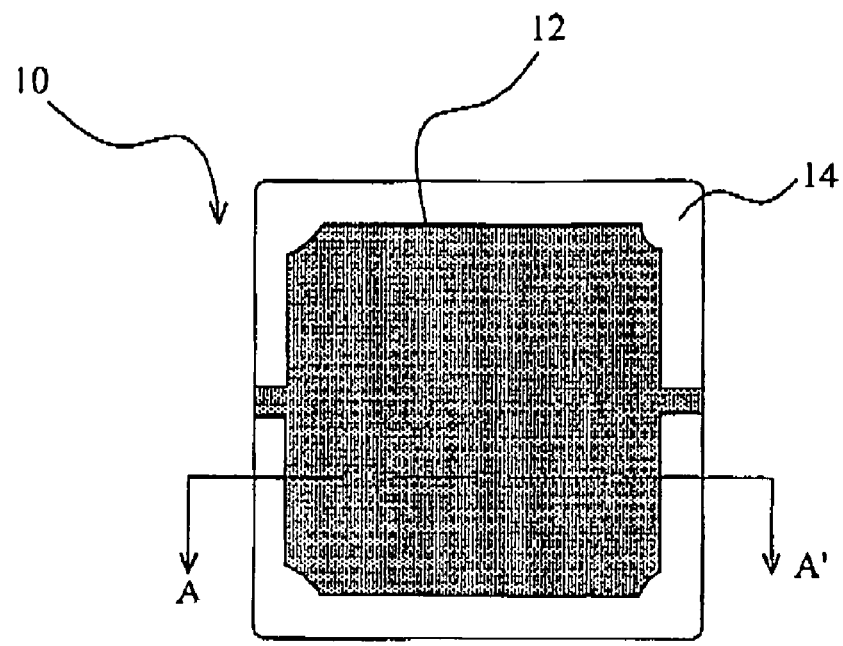
FIG. 1A and FIG. 1B are top view diagrams illustrating a columnar spacer in accordance with an embodiment of the present invention.
Figure 1B:
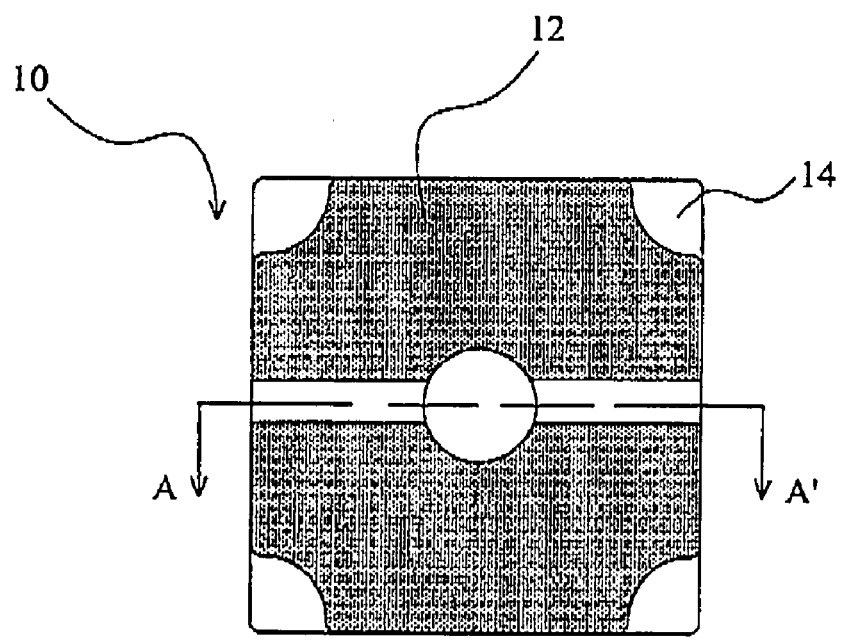

FIG. 1A and FIG. 1B are top view diagrams illustrating a columnar spacer in accordance with an embodiment of the present invention. A columnar spacer 10 has a mesa surface 12 with a pattern to expose the partial plateau surface 14 underneath. In one embodiment, the mesa surface 12 may be attached to a parallel substrate (not shown) for a liquid crystal display. Furthermore, the pattern may be with one or more openings in the mesa surface 12 and of symmetric shape for the center of the columnar spacer 10, but not limited to. Accordingly, the mesa surface 12 with the pattern may have an area smaller than the whole plateau surface 14. Accordingly, the mesa surface 12 with the pattern provides smaller area than a solid one without the pattern to bear when force is enforced on the substrate and transferred to the columnar spacer 10.

Figure 2A:
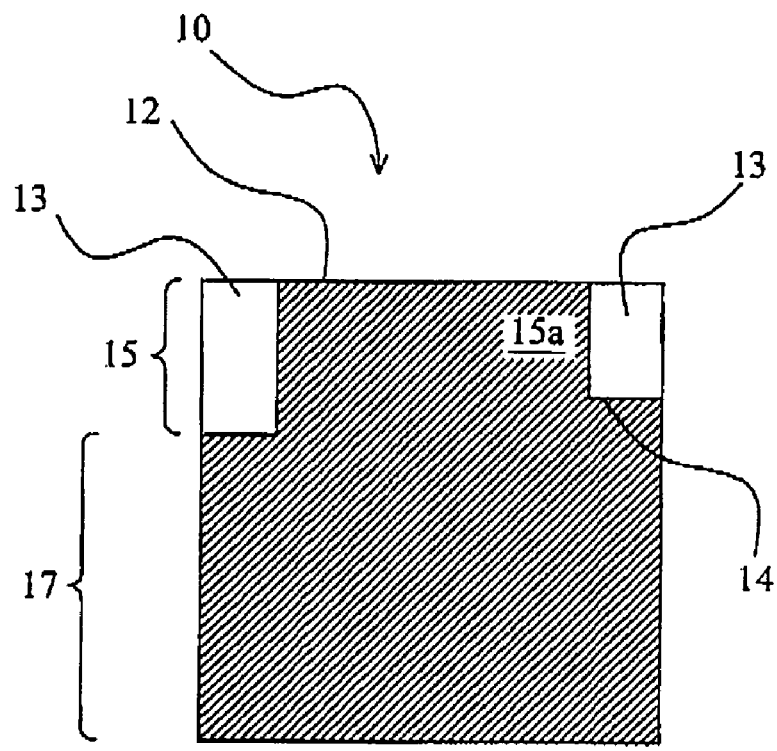
FIG. 2A and FIG. 2B are cross-sectional view diagrams illustrating the columnar spacer along with AA' of FIG. 1A and FIG. 1B.
Figure 2B:
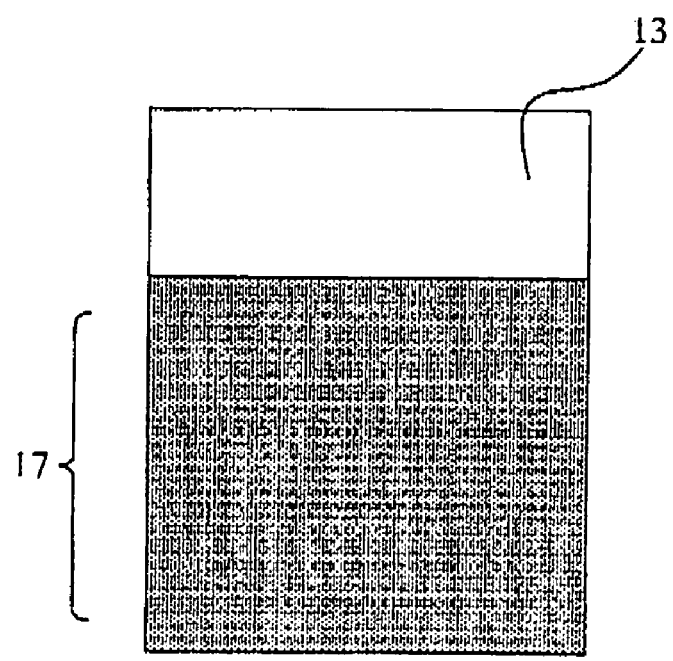
Figure 2C:
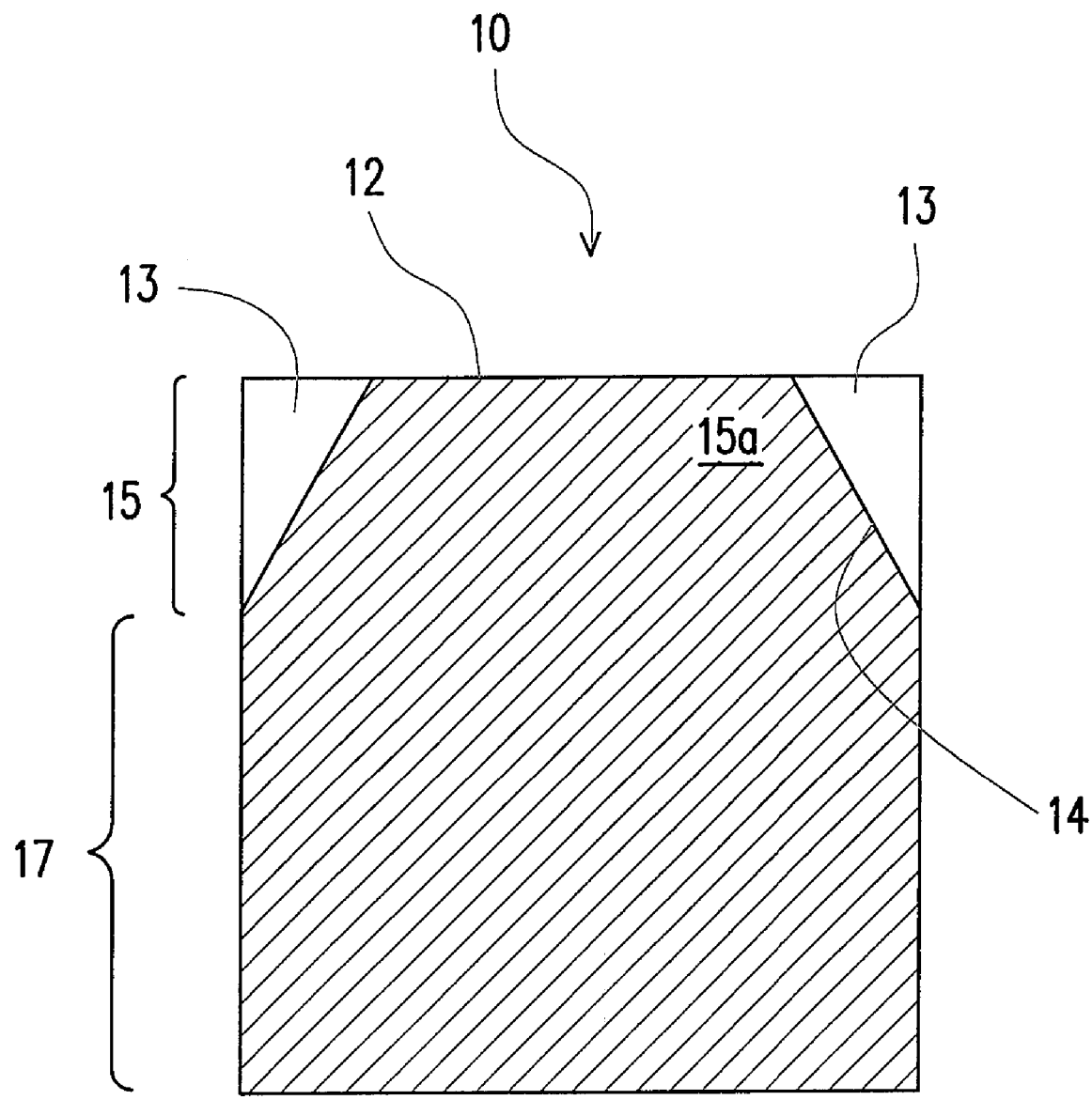
FIG. 2C is a cross-sectional view diagram illustrating the columnar spacer shown in FIG. 2A but having cavities whose sidewalls are respectively inclined to plateau surfaces.

FIG. 2A and FIG. 2B are cross-sectional view diagrams illustrating the columnar spacer along with AA' of FIG. 1A and FIG. 1B, respectively. FIG. 2C is a cross-sectional view diagram illustrating the columnar spacer shown in FIG. 2A but having cavities whose sidewalls are respectively inclined to plateau surfaces. The columnar spacer 10 may be with a crown member 15 and a solid columnar member 17 underneath. The whole plateau surface 14 maybe presented as the boundary between the crown member 15 and the solid columnar member 17. The mesa surface 12 is presented as the top surface of the crown member 15. There are cavities 13 in the crown member 15 to correspond to the pattern on the mesa surface 12 and extend forwards the plateau surface 14 from the mesa surface 12. In one embodiment, the cavities 13 may have similar depth downward in the crown member 15, but not limited to. Alternatively, the cavities 13 may have different depths downwards the solid columnar member 17. It is also said that there are solid sub-members 15a in the crown member 15 extended from the plateau surface 14 and with the mesa surface 12. Furthermore, the cavities 13 or solid sub-members 15a may be of columnar shape, but not limited to. For example, one cavity 13 may be with a sidewall vertical to or tilted to the plateau as depicted in FIG. 2C. That is, the solid sub-member 15a may be of columnar shape or other shape easy to be implemented by a conventional process. Furthermore, the surfaces exposed by plateau surface 14 are past through an exterior environment, which may be distributed around of the crown member 15 or within the crown member 15

Figure 3:
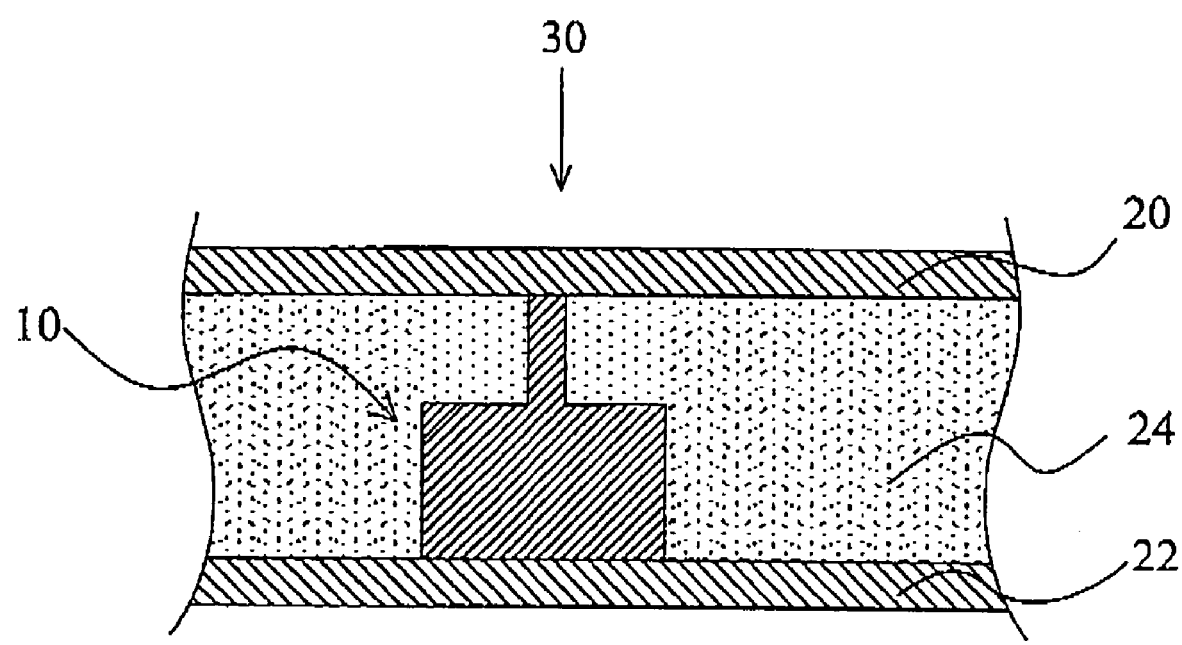
FIG. 3 is a cross-sectional view illustrating the columnar spacer between a pair of substrate in accordance with one embodiment of the present invention.

FIG. 3 is a cross-sectional view illustrating the columnar spacer between a pair of substrate in accordance with one embodiment of the present invention. A plenty of columnar spacers 10, also viewed as photo spacers, are formed by a conventional lithography process from the substrate 22 (such as a glass substrate with color filter thereon), arranged between the pair of two substrates 20 and 22 and surrounded by a liquid crystal layer 24 formed by one-drop fill method. The substrates 20 and 22 are parallel to each other and may have other layers or structures thereon buy not shown for simplification. Accordingly, when one force represented as an arrow 30 is rightly enforced upon the substrate 20 and transferred towards the columnar spacers 10, compared to a conventional columnar spacer of solid mesa surface without the pattern, the present columnar spacer 10 is against the force with the smaller mesa surface. On one hand, for application of the smaller force on the columnar spacer 10, such as vacuum force in assembly, the crown members substantially implement elastic deformation for enhancement of process tolerance. On the other hand, for the heavy force on the columnar spacer 10, such as finger force in use, the solid columnar members substantially implement support for loading the heavy force. It is noted that the solid columnar members also have little deformation when subjected to the smaller force, and the crown members also implement little support when subjected to the heavy force.

Accordingly, one of features of the present invention is to provide a columnar spacer with deformation varying with applied force. The columnar spacer is much elastic deformed on the condition of small force but less deformed on the condition of heavy force. Furthermore, another feature of the present invention is to provide a columnar spacer with a patterned mesa surface. The pattern of the mesa surface may be with some openings surrounded by a solid portion. The ratio of the openings to the solid portion may vary and depend on the characteristics of material for the columnar spacer. Furthermore, the depth of the cavity corresponding to the pattern may vary for meeting design requirement.

Accordingly, one embodiment of the present invention provides a liquid crystal display having a pair of substrates and plenty of columnar spacers arranged between the substrates. The columnar spacer includes a columnar member with a plateau parallel to the substrates and a crown member atop the plateau. The crown member has a plurality of solid sub-members extended from the plateau and the solid sub-members have a mesa smaller than the plateau.

Although the present invention has been explained in relation to its preferred embodiment, it is to be understood that other modifications and variation can be made without departing the spirit and scope of the invention as hereafter claimed.

What is claimed is:

1. A columnar spacer arranged between two substrates for liquid crystal display, the columnar spacer comprising:
   a solid member with a plateau; and
   a crown member atop said plateau and extended from said solid member, wherein said crown member has a mesa with a pattern exposing a portion of said plateau, said mesa is smaller than said plateau, and said crown member is further with a plurality of cavities therein, wherein the plurality of cavities has different depths.

2. The columnar spacer according to claim 1, wherein said pattern is corresponding to said cavities.

3. The columnar spacer according to claim 1, wherein any one of said cavity is with a sidewall vertical to said plateau.

4. The columnar spacer according to claim 1, wherein any one of said cavity is with a sidewall inclined to said plateau.

5. The columnar spacer according to claim 1, wherein said crown member is distributed around said exposed plateau.

6. The columnar spacer according to claim 1, wherein said crown member is distributed within said exposed plateau.

7. A liquid crystal display comprising:
   a pair of substrates holding a liquid crystal layer therebetween; and
   a plurality of columnar spacers arranged between said substrates, wherein any one of said columnar spacer comprises:
      a columnar member with a plateau parallel to said substrates; and
      a crown member atop said plateau, wherein said crown member has a plurality of solid sub-members extended from said plateau and said solid sub-members have a mesa exposing a portion of said plateau, said mesa is smaller than said plateau, and said crown member is further with a plurality of cavities therein, wherein the plurality of cavities has different depths.

8. The liquid crystal display according to claim 7, wherein any one of said solid sub-member is of columnar shape.

9. The liquid crystal display according to claim 7, wherein said crown members are elastic members.

10. The liquid crystal display according to claim 8, wherein said columnar member substantially provides support when the force is enforced upon said two substrates.

* * * * *